(No Model.) 2 Sheets—Sheet 1.
J. DANZ, 2d.
PAIL.

No. 597,051. Patented Jan. 11, 1898.

Witnesses:
F. J. Bradbury
H. S. Johnson

Inventor:
Jacob Danz 2nd
per: V. Anerwin
Attorney.

THE NORRIS PETERS CO., PHOTO-LITHO., WASHINGTON, D. C.

(No Model.) 2 Sheets—Sheet 2.
J. DANZ, 2d.
PAIL.
No. 597,051. Patented Jan. 11, 1898.
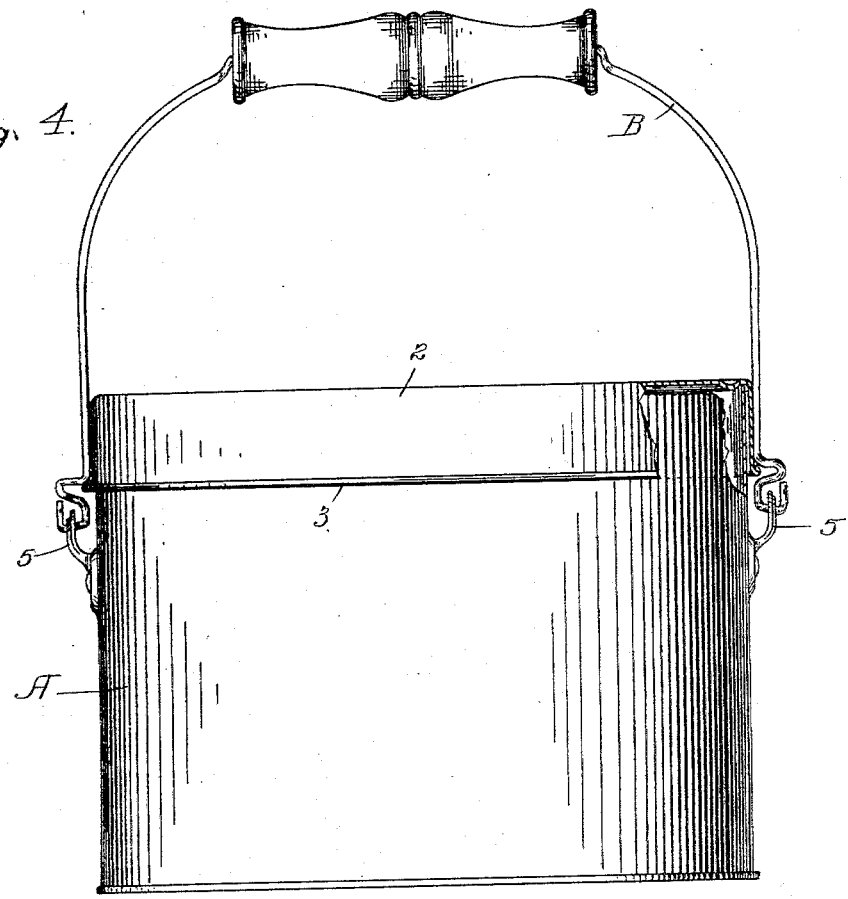
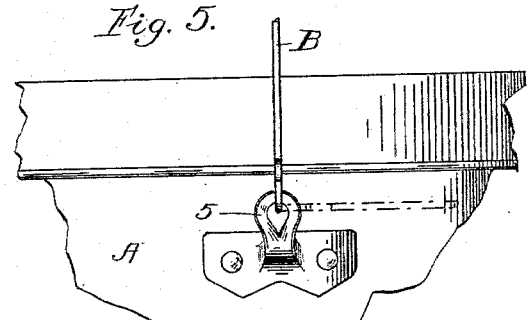
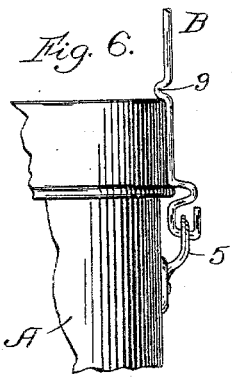
Witnesses:
Inventor:
Jacob Danz 2nd
per: Attorney

UNITED STATES PATENT OFFICE.

JACOB DANZ, 2D, OF ST. PAUL, MINNESOTA.

PAIL.

SPECIFICATION forming part of Letters Patent No. 597,051, dated January 11, 1898.

Application filed March 1, 1897. Serial No. 625,475. (No model.)

*To all whom it may concern:*

Be it known that I, JACOB DANZ, 2d., of St. Paul, Ramsey county, Minnesota, have invented certain Improvements in Pails, of which the following is a specification.

My invention relates to improvements in sheet-metal pails, its object being to provide improved means for locking the lid thereon when the bail or handle is in upright position.

To this end my invention consists in providing the bail of the pail with an inward bend or shoulder on each member adjacent to the top of the pail for engaging with the lid, so as to hold it securely upon the pail while the bail is in vertical position, but whereby the lid is free to be removed when the bail is turned downward. This object may be attained by a variety of constructions; but I prefer to provide an exteriorly-fitted lid or cover having an exterior bead or flange on its edge and provide an inward bend upon the bail to ride above and engage this flange when turned to upright position.

Various auxiliary features may be employed to secure the firmest possible grip of the bail upon the lid, some of which are hereinafter particularly described and claimed.

Figure 1:
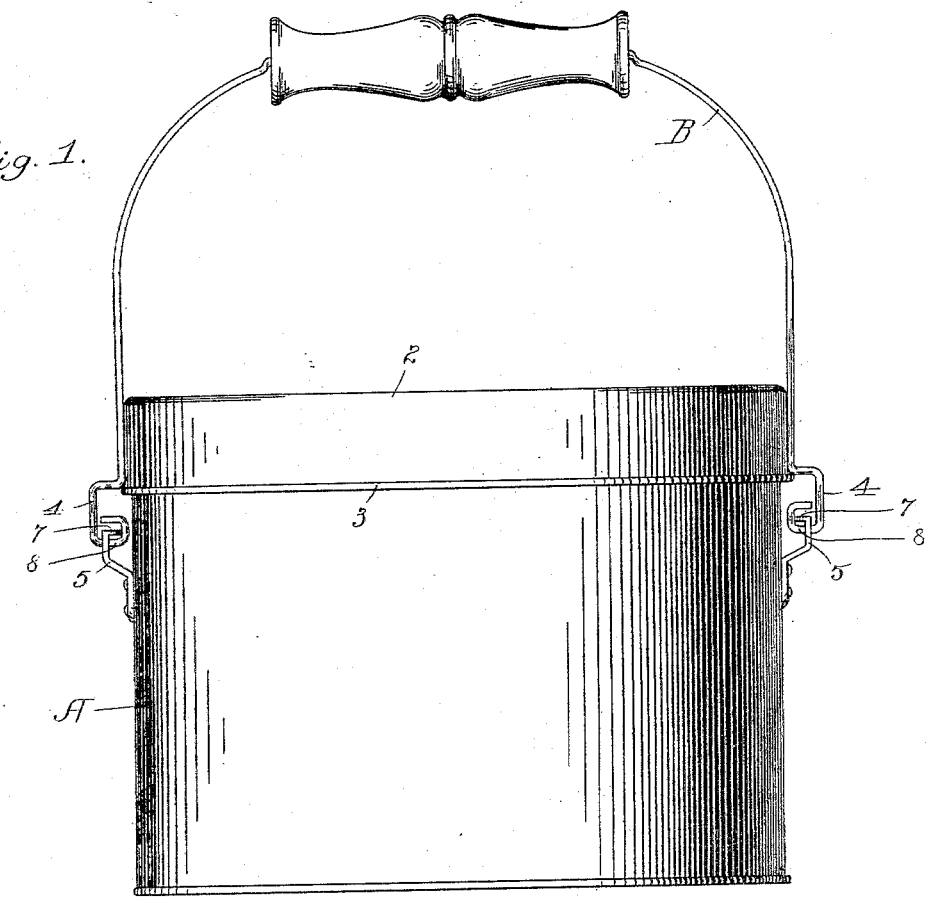
Figure 2:
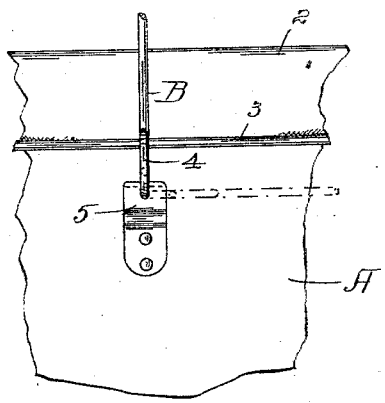
Figure 3:
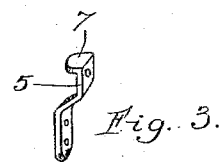

In the accompanying drawings, forming part of this specification, Figure 1 is a front elevation of my improved pail shown fitted with my improvements, the bail being in upright position and interlocked with the lid. Fig. 2 is a detail of one of the ears and connected bail. Fig. 3 represents a perspective detail of one of the ears, showing the flange or shoulder for pressing the bail inward or toward the body of the pail. Fig. 4 is an elevation of a modified construction. Fig. 5 is a detail of the same. Fig. 6 is a detail of a slightly-different modification.

In the drawings let A represent the pail, as shown, of ordinary cylindrical form, having the exteriorly-fitted lid 2, provided with an exterior flange or rib 3 on its edge.

The bail B is formed with a laterally-expanded eye 4, which engages the ear 5. This ear is bent so that its top stands out from the body of the pail, as shown, and has an inwardly-projecting horizontal convex rib or flange 7, which engages with the eye of the bail when it is turned in perpendicular position, thereby tending to press the bail inward or toward the pail. The bail above the eye is provided with an inward bend forming a substantially right-angled shoulder 8, so positioned as to bear upon the flange 3 of the lid, while the body of the pail itself bears against the side of the lid as pressed inward by the flange upon the ear. It will thus be seen that the lid is held firmly in place so long as the bail remains in upright position, but is instantly freed as soon as the bail is turned downward, the bail being also allowed to spread outward as the eye passes out of engagement with the flange upon the ear.

In the modified construction shown in Fig. 4 I dispense with the flange upon the ear, and in lieu thereof form the eye laterally extended, but with the wire forming the bottom part upwardly inclined toward the body of the pail, so that the lifting of the pail by the bail tends to cause the bail to slip inward or toward the body of the pail and thereby more firmly grip the lid.

In the modification shown in Fig. 6 I further and more firmly secure the lid by means of a reverse bend in the body of the bail, forming an inwardly-projecting shoulder 9 to engage the top of the lid.

I claim—

1. In a pail, the combination with its lid having a circumferential rib or flange, of the bail having an inwardly-projecting shoulder adapted to automatically engage said flange so as to lock said lid in position when the bail is in raised position, and means for carrying the eyes of the bail inward, so as to clamp the lid.

2. In a pail of the class described, the combination with the lid, and the bail thereof, of the projection upon the bail adapted to ride upon and engage with the lid when the bail is in raised position, and the projection or shoulder upon the pail for forcing the ends of the bail inward so as to clamp the lid.

3. In a utensil of the class described, the combination with the exterior lid, and the bail, of the inward bend or projection upon the bail adapted to automatically engage the lid as the bail is turned to upright position, and the means for automatically pressing the bail inward when upturned so as to more firmly engage the lid.

4. In a utensil of the class described, the combination with the pail, its exteriorly-fitted lid having a circumferential exterior flange, the bail having laterally-expanded eyes, the ears upon said pail to receive said eyes, provided with an inwardly-projecting convex shoulder or flange adapted to thrust the bail inward or toward the body of the pail when upturned, and the shoulders or bends upon the bail adapted when the bail is upturned to automatically engage and interlock with the flange upon the lid.

In testimony whereof I affix my signature in presence of two witnesses.

JACOB DANZ, 2D.

Witnesses:
MINNIE L. THAUWALD,
H. S. JOHNSON.